J. GALLATIN.
Plow.
No. 3,052. Patented Apr. 15, 1843.
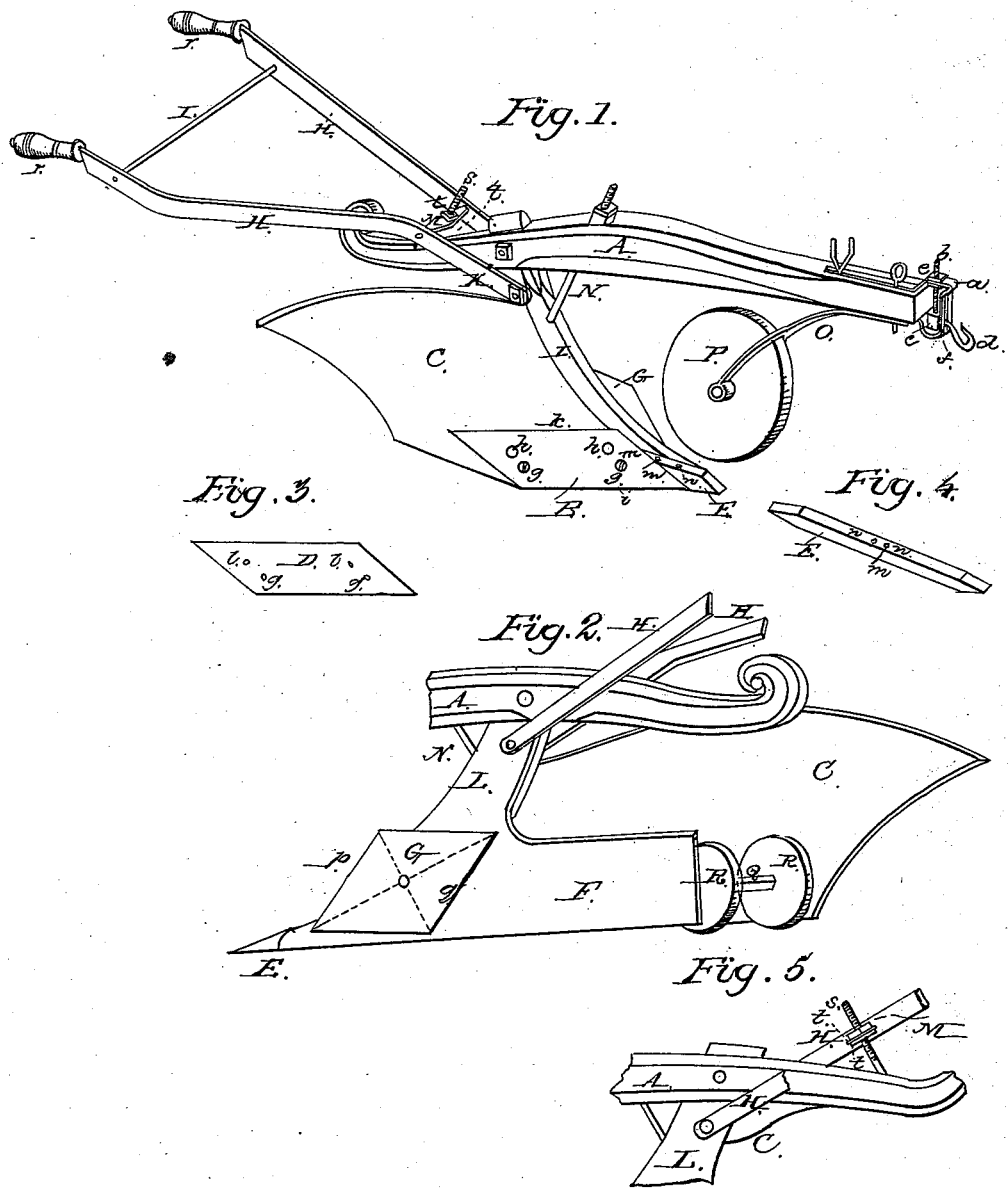

UNITED STATES PATENT OFFICE.

JEREMIAH GALLATIN, OF MANCHESTER TOWNSHIP, MORGAN COUNTY, OHIO.

IMPROVEMENT IN PLOWS.

Specification forming part of Letters Patent No. 3,052, dated April 15, 1843.

*To all whom it may concern:*

Be it known that I, JEREMIAH GALLATIN, of Manchester township, Morgan county, and State of Ohio, have invented new and useful Improvements on the Plow; and I do hereby declare that the following is a full, clear, and exact description of the construction and operation of the same, reference being had to the annexed drawings, making part of this specification, in which—

Figure 1 is a perspective view of the plow; Fig. 2, another perspective view of part of the plow; and Figs. 3, 4, and 5 are details.

The main or principal parts forming the plow are constructed in the usual manner, except as follows:

The clevis $a$ on the farther end of the beam A is furnished with a screw, $b$, which terminates at its lower extremity by a die, $c$, the latter having a hole through it in the direction of the beam, through which the hind end of the swivel-hook $d$ passes, and wherein it plays. At the upper end of the screw are two nuts, $e$ $e$, one on the upper and one on the under side of the upper part of the clevis. The clevis has in front a vertical slit, $f$, for the swivel-hook to pass through. This screw $b$, with its appendages, serves for the purpose of regulating the height of the swivel-hook $d$ according to the size of cattle used.

The principal share B is in form a paralellogram, as shown on drawings. It is held fast on the top of mold-board C by screws $g$ $g$, with nuts on the under side of C, having additional holes $h$ $h$, which permit of shifting the share downward when the wear of the lower edge, $i$, requires it. After the lower edge, $i$, has been fairly worn out the share may be turned round so as that the upper edge, $k$, takes the place of $i$, acting then as lower edge. Under the principal share B is another, D, which is shown on the drawings separately in Fig. 3. It is of a similar shape as B, but is somewhat narrower, and is held fast by the same screws $g$ $g$, and has also additional holes $l$ $l$. After the two edges $i$ and $k$ of the share B have been worn out the share D is brought in requisition, the worn-out share B serving as a plate to steady the share D. Thus the plow is furnished with four distinct edges for use. The edge in use sharpens itself, chamfering like the edge of a plane-iron.

Next there is the plain point E, which slips in between the landside F, the mold-board C, and the shares B and D. This plain point is held fast in the center by a bolt, $m$, which passes through it and the under side of the landside, with additional holes $n$ $n$ for shifting it. It is so shaped as that it may be turned on its sides or endwise, as occasion may call for. (See Fig. 4 on drawings.)

On the landside is the diamond-cutter G, which is fastened to the sheth L by one screw, $o$, only, in consequence of its being thicker or having a swell in the middle, wear it as it may. While the edge $p$ of this cutter is wearing dull the edge $q$ is sharpening against the land.

The plow-arms H H are of wrought-iron, the left one, or the one on the land side, nearly straight, the other bent, as shown on drawings. They are furnished at their upper ends with wooden knobs $r$ $r$, serving as handles. Near their upper ends they are connected by a thin round bar, I, which has screws on both ends, on which the arms are fastened at such a distance from each other as may suit the operator best. On their lower ends the arms are fastened by means of a bolt, K, with a head on one end and a screw and nut on the other end. This bolt passes through a hole in the sheth L immediately below the beam A. A little distance from the lower ends of the arms, and immediately and directly over the beam, a flat crossbar, M, connects the arms. Through the middle of it passes a screw, $s$, which is fastened into the upper side of the beam in an inclined direction of about forty-five degrees. On the under side, and also on the upper side, of the cross-bar M the screw $s$ has nuts $t$, by which the height of the arms, and consequently the handles, may be regulated to suit the stature of the plowman, the bolt K serving as the center whereon they move.

Through the beam and the sheth passes a bolt, N, with screw and nut at its upper end, in an inclined position of about forty-five to sixty degrees with the horizon, serving as a brace to steady the fabric.

On the farther end of the beam, near the clevis, and on its under side, is fastened a spring O. This spring tends toward the point E and downward. It is forked in such a manner as to receive the front wheel, P, which is hung between the forks and directly over the plain point.

Between the mold-board and the landside, and behind, is the shaft Q, whereon there are two small wheels, R R, (serving as friction-wheels running on the bottom of furrow,) which revolve with the shaft in bearings on the mold-board and the landside.

The plow leans back and over toward the landside, the body of the plow and the wheels to be of cast-iron, the edges to be steel, the arms to be wrought-iron, and the beam and the knobs to be wood.

Operation: First the swivel-hook *d* has to be adjusted to suit the size of the cattle to be used. This is done by means of the screw *b* and the two nuts *e e*. Then the arms H H are either raised or lowered by the screw *s*, which passes through the cross-bar M, so as to suit the stature of the operator. The shares, the plain point, and the diamond-cutter having been properly secured, the operation may commence. The front wheel, P, regulates the depth and causes the plow to run easy in consequence of the wheel being hung in a spring in the particular manner and place above described. The smaller wheels R R behind assist in the easy run of the plow, preventing friction and enabling the plowman to draw the plow back with a great deal of ease by slightly pressing on the arms. If the lower edge of the share B is worn out, it may be slipped down one hole. If that is worn off also, the share is turned, and what until then had been the upper edge becomes now the lower one, and is moved in the same manner. After both edges have done all the services they could, resort is had to the share D, which is served in the same manner. The plain point E, when dull, may be turned sidewise or endwise, so as to present again a sharp edge. The diamond-cutter G, being fastened by one screw only in consequence of having a swell in the middle, can easily be turned round to obtain a sharp edge.

What I claim as my improvements, and desire to secure by Letters Patent, is—

1. The mode and manner of adjusting the clevis with moving swivel-hook, and its application to the plow.

2. The manner of adjusting the arms or handles.

3. The hanging of the wheel P in a spring in the position as above described.

JEREMIAH GALLATIN.

Witnesses:
WILLIAM MARQUIS,
JAMES HELLYER.